No. 713,982. Patented Nov. 18, 1902.
J. J. GYLLDENBORG.
WHEELED SCOOP.
(Application filed Jan. 8, 1902.)
(No Model.) 2 Sheets—Sheet 1.
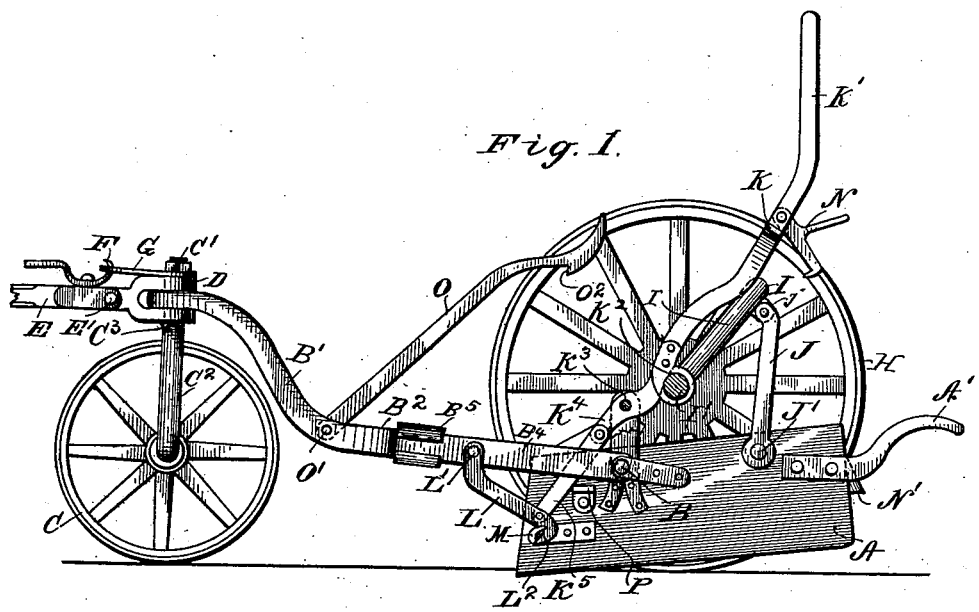
Fig. 1.
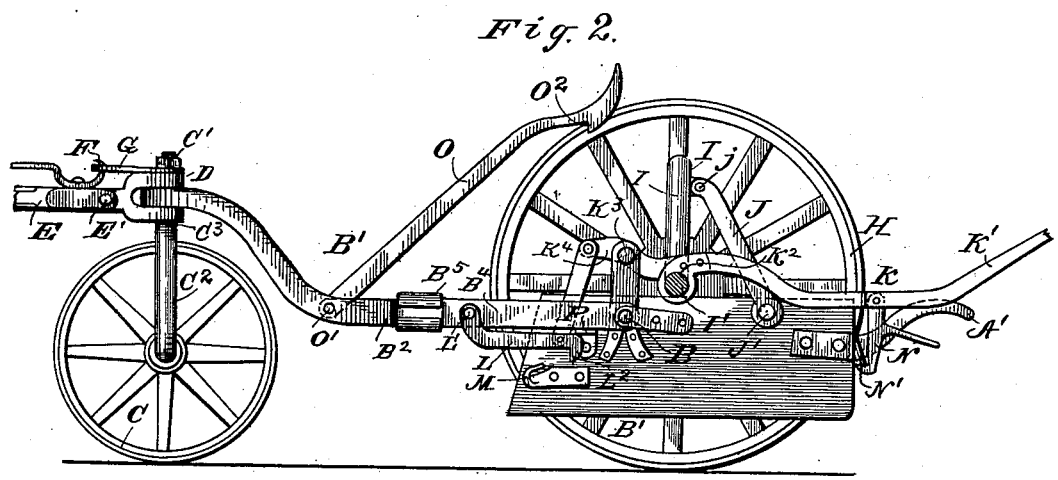
Fig. 2.
Fig. 6.
WITNESSES:
W. R. Edelen.
Perry B. Turpin.
INVENTOR
Jonas J. Gylldenborg.
BY Munn & Co.
ATTORNEYS
THE NORRIS PETERS CO., PHOTO-LITHO., WASHINGTON, D. C.

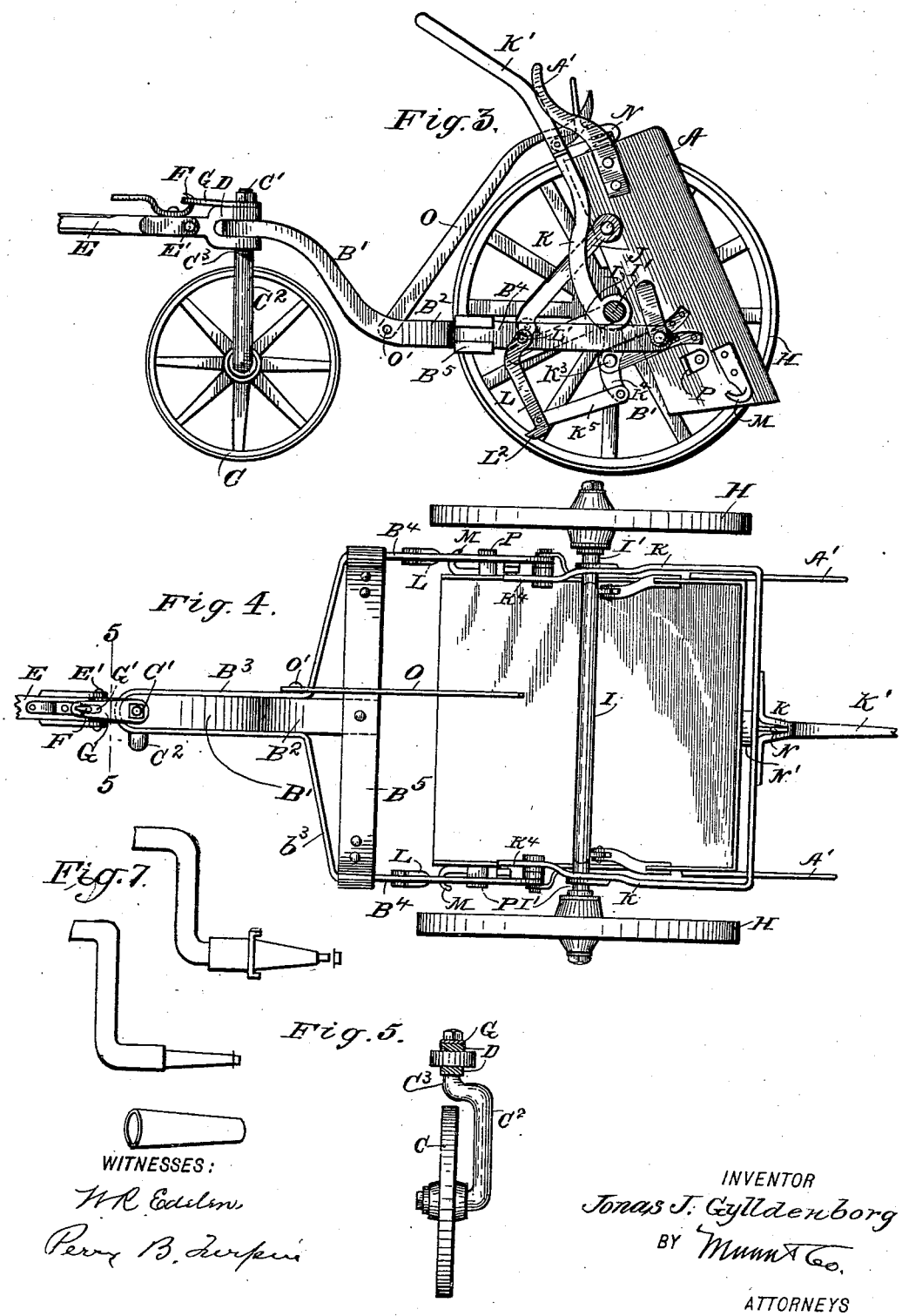

UNITED STATES PATENT OFFICE.

JONAS JONSSON GYLLDENBORG, OF GRENADA, MISSISSIPPI.

WHEELED SCOOP.

SPECIFICATION forming part of Letters Patent No. 713,982, dated November 18, 1902.

Application filed January 8, 1902. Serial No. 88,851. (No model.)

*To all whom it may concern:*

Be it known that I, JONAS JONSSON GYLLDENBORG, a citizen of the United States, residing at Grenada, in the county of Grenada and State of Mississippi, have made certain new and useful Improvements in Wheeled Scoops, of which the following is a specification.

My invention is an improvement in wheeled scoops, and has for an object to provide certain improvements in the general construction of the implements, as well as in the operating means and devices for supporting the scoop; and the invention consists in certain novel constructions and combinations of parts, as will be hereinafter described and claimed.

In the drawings, Figure 1 is a side view of the scoop adjusted to position in which it can be filled by scraping along the ground. Fig. 2 is a side elevation showing the scoop elevated in position for transporting the scoop and contents. Fig. 3 is a side elevation showing the empty scoop adjusted to position for transportation from point to point. Fig. 4 is a top plan view of the scoop with the parts in the position shown in Fig. 2. Fig. 5 is a detail front view of the pilot-wheel and its supporting-yoke. Fig. 6 shows a somewhat different construction of tongue, and Fig. 7 illustrates the spindle and sand-boxes.

The scoop A may in general construction and shape be similar to the ordinary scoops now in use, is provided at its rear end with handles A', and is pivoted near its front end at B to the rear end of the draft-frame B', which frame is formed with the beam $B^2$, reinforced on opposite sides by the bars $B^3$, which extend outwardly at their rear ends at $b^3$ and thence rearwardly at $B^4$, being connected together and with the rear end of the beam $B^2$ by the cross-bar $B^5$. The beam $B^2$ and its reinforcing-bars $B^3$ curve upwardly toward its front end, as shown in Fig. 3, and provides a pivot at its upper forward end at C' for the yoke $C^2$, to which is journaled the pilot-wheel C. The yoke $C^2$ is provided at its upper end with the vertical portion at $C^3$, which journals in the beam $B^2$, and also forms a pivot for the clevis D, so such clevis can swing laterally at its front end. To this front end is pivoted the tongue E at E' by a horizontal pivot, so the tongue can raise and lower at its front end, such movement being limited by the hook F on the tongue engaging in the slotted opening G' of the plate G, which is secured on the clevis D, preferably by the pivoted portion of the yoke $C^2$, as best shown in Figs. 1, 2, 3, and 4.

From the foregoing description it will be seen the scoop A is pivoted near its front end to the draft-frame, so such scoop can be adjusted to the different positions shown in Figs. 1, 2, and 3.

The scoop is carried by the wheels H, which are journaled on the spindles supplied on the arms I' of the axle, which axle is arched at I between its arms I', as shown. Hangers J connect the arch of the axle with the rear portion of the scoop A, being pivoted at $j$ in connection with the arch of the axle and being secured to the scoop at J', as shown in Figs. 1, 2, and 3.

The main lever K has the handle portion K' at its rear end, and the forwardly-extending side portions, which are pivoted at $K^2$ on the arms of the axle, extend forwardly in advance of such arms, (see Fig. 1,) are pivotally connected at $K^3$ with the scoops, are extended at $K^4$ in advance of such pivotal connection, and have their forward extensions $K^4$ connected by links $K^5$ with latches L. These latches L are pivoted at L' at one end to the draft-frame in advance of the scoop and are provided at their rear ends at $L^2$ with hook-like portions which move into and out of engagement with catches M on the scoop, which catches M may be in the form of hooks, as shown. The main lever K is also supplied at or near its handle portion with a latch N, which engages with a seat N' on the rear of the scoop, as shown in Figs. 2 and 3, in certain adjustments of the parts. I also provide a supporting-hook O, pivoted at O' to the draft-frame and arranged at $O^2$ to secure the parts in the position shown in Fig. 3, preferably by engagement with the main lever, as shown in the said Fig. 3.

On opposite sides of the scoop I provide at P shoulders or projections which underlie a bar beneath the draft-frame in advance of the pivot B and limit the upward movement of the scoop, as will be understood from Fig. 2 of the drawings.

In the operation of the improved construction it will be noticed that if the main lever be thrown up to the position shown in Fig. 1 it will rock upon the arms of the axle, will lower the front end of the scoop from the position shown in Fig. 2 to that shown in Fig. 1, and will throw the latch L down to the position shown in Fig. 1, in which it will engage with the front end of the scoop and will hold such end against rearward movement. The apparatus can now be used to scrape up earth or the like to fill the scoop, and when filled the scoop may be adjusted to the position shown in Fig. 2 by lowering the main lever from the position shown in Fig. 1 to that shown in Fig. 2 and can be held in the latter position by throwing the latch N into engagement with the scoop, as shown in Fig. 2. When in this position the main lever will have lifted the front end of the scoop, and the latter will retain its contents until it is desired to dump it. In dumping the scoop it may be rocked to the position shown in Fig. 3 or to any intermediate position between that shown in Fig. 2 and the position shown in Fig. 3. The latter position is one to which the scoop is adjusted for transportation from point to point and is desirable because it throws the rear wheels nearer the pilot-wheel C, thus shortening the device, so the draft thereof will be easier.

It will be noticed that I support the scoop in the position shown in Fig. 2 at its front end by means of the main lever and at its rear end by means of the hangers J from the arch of the axle.

By connecting the pole with the apparatus by means of the hook F, having a movable connection with the strap G, as before described, I avoid strain on the neck of the horse or mule attached to the scraper and relieve the pole of the jars incident to any up or down movement of the scraper, as will be readily understood.

When the scoop is adjusted to the position shown in Fig. 3, it may be held by the hook O engaging with the main lever, as shown in the said figure.

In Fig. 6 I show in plan and side view a tongue fixed with respect to the draft-frame and which can be used without the front wheel C. (Shown in Figs. 1 and 2.)

Fig. 7 illustrates the spindles and sand-boxes to receive the wheels H.

The links J are important features of my invention, as by the same I brace the crossbar or crown of arch and operate to lift said crown in raising the scoop from the position shown in Fig. 1 to that shown in Fig. 2. In this operation the projections P on the front ends of the scoop bear beneath the bars B⁴, and as the rear end of the lever K is depressed the links J, operating between the rear ends of the scoop and the crown of the arch, lift the latter to the position shown in Fig. 2. These links also combine with the arch to increase the power of the lever K and render the lifting of the scoop out of the ground easier and permit the scoop to break out of the ground quickly, as desired. The links J also support the rear end of the scoop and increase the rigidity of the apparatus, as well as facilitate the lifting of the scoop and the dumping of same.

Having thus described my invention, what I claim as new, and desire to secure by Letters Patent, is—

1. The combination of the main frame, the scoop pivoted near its front end to the main frame, the arched axle, the hangers connected with the arch of the axle and operating between the same and the rear end of the scoop, the main lever pivoted on the arms of the axle and extended in advance of such axle and having a pivotal connection with the scoop in advance of the axle and having an extension in advance of such pivotal connection, links connected with such extensions, and latches pivoted to the main frame and connected with said links and arranged for operation by the main lever into and out of engagement with the scoop, substantially as set forth.

2. The combination with the arched axle and the scoop and the main frame, of the main lever pivoted in connection with the axle, and connected in advance of such pivot with the front portion of the scoop, and the hangers independent of the main lever and connected with the axle and with the rear portion of the scoop, substantially as set forth.

3. The combination of the main frame, the scoop, the arched axle, and the main lever pivoted on the axle and having in advance of such pivot a pivotal connection with the scoop, and hangers between the rear portion of the scoop and the arched axle, substantially as set forth.

4. The combination with the scoop, and the arched axle, of hangers connected with the arch of the axle and with the rear portion of the scoop, and the main lever pivoted to the axle and devices connected with the main lever for supporting the front end of the scoop, substantially as set forth.

5. The combination of the arched axle and the scoop, the hangers connected with the arch of the axle and supporting the rear portion of the scoop, the main frame pivoted in connection with the front portion of the scoop, and the main lever pivoted to the axle, extended in advance thereof, and connected with the front portion of the scoop, latch devices on the main frame for engagement with the scoop and connections between said latch devices and the main lever, substantially as set forth.

6. The combination substantially as described, of the main frame, the scoop, the arched axle, the hangers connected with the arch of the axle and the rear portion of the scoop, the main lever pivoted to the axle, extended in advance of the axle and pivoted in connection with the scoop and having a forward extension beyond said pivotal connection, links connected with such pivotal connection, latches pivoted to the main frame and connected with said links whereby they may be operated by the main lever into and out of engagement with the scoop, and the latch on the main lever in position for engagement with the rear portion of the scoop, substantially as set forth.

7. The combination of the pilot-wheel, the beam, the clevis, the pole, the plate connected with the clevis and the hook connected with the pole and movable in connection with the plate, substantially as set forth.

8. The combination with the beam, the pilot-wheel and its yoke, of the pole jointed at its rear end whereby it may move up and down at its front end and means for limiting such movement, substantially as set forth.

9. A wheel-scoop substantially as described, having the scoop proper, the arched axle to which said scoop is journaled, draft devices connected with the scoop proper, devices on the scoop proper near its front end to bear beneath the draft devices, links connecting the upper portion or crown of the arched axle with the rear portion of the scoop proper, and the main lever pivoted on the axle and having its front end connected with the front portion of the scoop proper, substantially as set forth.

JONAS JONSSON GYLLDENBORG.

Witnesses:
WALTER B. BUSH,
N. C. WILLIAMSON.